United States Patent [19]

Yoshikazu

[11] 4,325,137

[45] Apr. 13, 1982

[54] POWER SUPPLY SYSTEM TO TERMINAL EQUIPMENT THROUGH AN OPTICAL FIBER CABLE

[75] Inventor: Ikeda Yoshikazu, Tama, Japan

[73] Assignee: Kokusai Denshin Denwa Co., Ltd., Tokyo, Japan

[21] Appl. No.: 160,943

[22] Filed: Jun. 19, 1980

[30] Foreign Application Priority Data

Jun. 26, 1979 [JP] Japan .................................. 54-79713

[51] Int. Cl.³ ............................ H04J 3/02; H04B 9/00
[52] U.S. Cl. ........................................ 370/4; 455/607; 455/614; 455/617
[58] Field of Search .................. 370/1, 4, 29; 455/603, 455/606, 607, 610, 612, 614, 617

[56] References Cited

PUBLICATIONS

Applications of Optical Transmission in Today's and Future Communication Networks—Unterberger et al.—2nd European Conf. on Optical Fiber Communication (1976), Communication XII.3, pp. 383–387.
IEEE Communications Magazine, The IEEE Communications Society, Mar. 1979, vol. 17, No. 2, pp. 33–34.

*Primary Examiner*—Marc E. Bookbinder
*Attorney, Agent, or Firm*—Robert T. Gammons; David G. Conlin

[57] ABSTRACT

In a communication system between an exchange station and terminal equipment through an optical fiber cable, a power supply for operating the terminal equipment is supplied from the exchange station through the optical fiber cable in a form of an optical energy. The optical fiber cable is utilized both for transmitting a voice signal between terminal equipment and the exchange station, and for transmitting the power supply from the exchange station to terminal equipment on a time divisional basis. When the terminal equipment is inactive, the exchange station transmits no energy, or transmits intermittently an optical pulse. The duration that the optical pulse is transmitted when the terminal equipment is inactive, is less than 1/10 of the total time. When a handset of the terminal equipment is picked-up and the terminal equipment becomes active, the change of the status of the terminal equipment is relayed to the exchange station using that limited amount of energy from the exchange station, or the output of the generator which provides the electricity upon picking-up a handset. When the terminal equipment becomes active, the exchange station is switched to constant transmitting of the power pulse to the terminal equipment for operating the same.

6 Claims, 8 Drawing Figures

POWER SUPPLY SYSTEM TO TERMINAL EQUIPMENT THROUGH AN OPTICAL FIBER CABLE

BACKGROUND OF THE INVENTION

The present invention relates to a power supply system through an optical fiber cable, in particular, relates to such a system in which a telephone subscriber is connected to an exchange station through an optical fiber cable, and the energy for operating the telephone set of that subscriber is supplied from the exchange station through that optical fiber cable.

In a conventional telephone communication system, telephone subscribers are connected to an exchange station through a metallic wire or a metallic cable, and the energy for operating a telephone set at each subscriber is supplied from an exchange station through that metallic wire. The energy for operating a telephone set is usually DC (direct current) current, but is not AC (alternate current) current.

There is a possibility that telephone subscribers can be connected to an exchange station through an optical fiber cable, instead of a metallic cable, in the future, since an optical fiber cable is excellently suited in that (1) the manufacturing cost of an optical fiber cable is expected to be lowered since the material of an optical fiber cable is cheap compared with that of a metallic cable, (2) an optical fiber cable can provide a high speed pulse communication, and (3) an optical fiber cable is light in weight, and small in size.

When an optical fiber cable is utilized to connect telephone subscribers to an exchange station, the problem is how to supply power to subscribers from a central station. That is to say, the station can not supply electrical power through an optical fiber cable, which is not conductive. A commercial electrical power supply provided at each subscriber is not convenient in case of the interruption of the power supply service. A battery installed in each subscriber is also inconvenient for the maintenance of a battery. An interstitial cable for the power supply along a communication optical fiber cable is not desirable since two kinds of cables must be installed and the investment for cables will be doubled.

The most promising proposal for the power supply in case of an optical fiber cable, is to transmit an optical energy from an exchange station through the optical fiber cable and to convert the optical energy to an electrical energy at the subscriber's side. That proposal is shown in "New devices used to power experimental phone over a glass fiber" IEEE Communications Magazine, March 1979, pp. 33–34.

FIG. 1 is the block diagram of that prior power supply system from an exchange station to a subscriber proposed by said article.

In FIG. 1, the reference numeral 1 is a terminal device in a subscriber or a telephone set, 2 is an exchange station, and 3 is an optical fiber cable connected between the station and the subscriber. The station 2 operates of course as an exchange station. The terminal device 1 has an optical-electrical converter 11, a DC booster 12 which raises the DC (direct current) voltage obtained at the output of the converter to the desired voltage, 13 is a demodulator which demodulates the output of the converter 11 to the form suitable to a receiver 14. The reference numeral 15 is a microphone, 16 is a modulator which modulates the voice signal from the microphone 15 to the form suitable to the transmission in an optical fiber cable, 17 is an electrical-optical converter for converting the electrical signal from the modulator 16 to the optical signal, which is transmitted to the station 2 through the optical fiber cable 3. Also, the station 2 has an electrical-optical converter 21, an optical-electrical converter 22, and a power pulse generator 23 which generates pulse signals as a power supply. The output of the converter 22 and the input of the converter 21 are connected to a telephone exchange system through a conventional modulator/demodulator.

In FIG. 1, the power pulse generator 23 installed in the station 2 generates the periodic pulses which have the energy during the hatched duration (x) in FIG. 2, and those pulses are converted to an optical form by the converter 21. The converted optical pulses are transmitted to the subscriber 1 through the optical fiber cable. The optical-electrical converter 11 in the subscriber 1 receives those optical pulses and converts them to an electrical form, which is applied to the DC booster 12. The DC booster 12 rises the DC voltage to a desired value, and stabilizes the same, which is supplied to other circuits in the subscriber 1.

The station 2 transmits a voice signal to the subscriber 1 in the form of a pulse modulation signal (pulse which modulation signal, or pulse amplitude modulation signal). That pulse signal is inserted in the duration (z) of FIG. 2. That pulse signal is converted by the converter 11 from the optical form to the electrical form, and the converted pulse signal is applied to the demodulator 13, which demodulates the signal and applies the demodulated signal to the receiver 14. The receiver 14 provides the acoustic voice signal. On the other hand, the electrical signal from the microphone 15 is applied to the modulator 16, which modulates the voice signal to the pulse modulation signal, and inserts that pulse signal in the time slot (y) of FIG. 2. Thus, the power transmission (x), and the voice transmission (y) and (z) are performed on the time divisional basis through a single optical fiber cable.

The important technical matters for facilitating that power transmission through an optical fiber cable are (1) the optical fiber cable with small transmission loss, and (2) the improvement of the conversion efficiency of an optical-electrical converter 11. And it should be noted that those technical matters have been solved at the present stage.

However, the power supply system shown in FIG. 1 has the disadvantage that the power consumption in an exchange station is rather large, since the power supply is always supplied irrespective of the actual status of subscribers. That is to say, even when a subscriber does not operate, the station must supply power for operating an electronic circuit in a subscriber for detecting a calling action of the subscriber. If that power supply were interrupted, the subscriber could not send any signal to the station.

Accordingly, an exchange station must always supply the power pulse to all the subscribers. The electric power necessary for that power supply is estimated as follows. It is assumed that the total of the electrical-optical conversion loss in an exchange station, the transmission loss in an optical fiber cable, and the optical-electrical conversion loss in a subscriber is expected in the range between 10 dB and 20 dB, and the power consumption in electrinic circuits in each subscriber is 0.1 watt. Then, the station must always supply the power supply 1–10 watts to each subscriber. A conventional power supply system through a metallic wire supplies the electric power only when a subscriber is active, and only the voltage is supplied but no power is consumed during a subscriber is inactive. On the contrary, that large power consumption 1–10 watts in case of an optical fiber cable is the serious disadvantage.

SUMMARY OF THE INVENTION

It is an object, therefore, of the present invention to overcome the disadvantages and limitations of a prior power supply system to terminal equipment through an optical fiber cable, by providing a new and improved power supply system to terminal equipment through an optical fiber cable.

It is also an object of the present invention to provide a power supply system to terminal equipment from an exchange station through an optical fiber cable, in which the power consumption in the exchange station is reduced by supplying small amounts of power to terminal equipment when the terminal equipment is inactive.

The above and other objects are attained by a power supply system to terminal equipment from an exchange station through an optical fiber cable comprising a single optical fiber cable connecting the exchange station to terminal equipment for transmitting signals in both directions from the station to the terminal equipment and from the terminal equipment to the station, and for transmitting an optical energy in the form of an optical pulse from the station to the terminal equipment on a time divisional basis; a terminal equipment having at least a microphone and a receiver connected to said optical fiber cable through conversion means for converting a signal between an electrical form and an optical form, and means for recognizing whether the terminal equipment is inactive or active and transmitting a status signal to the exchange station when the status of the terminal equipment changes from the inactive status to the active status; an exchange station having at least an exchange control system connected to the optical fiber cable through conversion means for converting a signal between an electrical form and an optical form, a power pulse generator, a gate circuit for the power pulse of the power pulse generator to the optical fiber cable, and means for controlling said gate circuit so that when the terminal equipment is inactive the gate circuit is opened intermittently less than 1/10 of time or said gate circuit is completely closed, and when the terminal equipment is active the gate circuit is almost always opened.

According to the modification of the present invention, the terminal equipment has a generator which provides the piezo-electricity when a handset is picked up, and said piezo-electricity serves to transmit the information that the terminal equipment becomes active to the exchange station. In this case, the exchange station provides no power pulse to the terminal equipment so long as the terminal equipment is inactive.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

Figure 3:
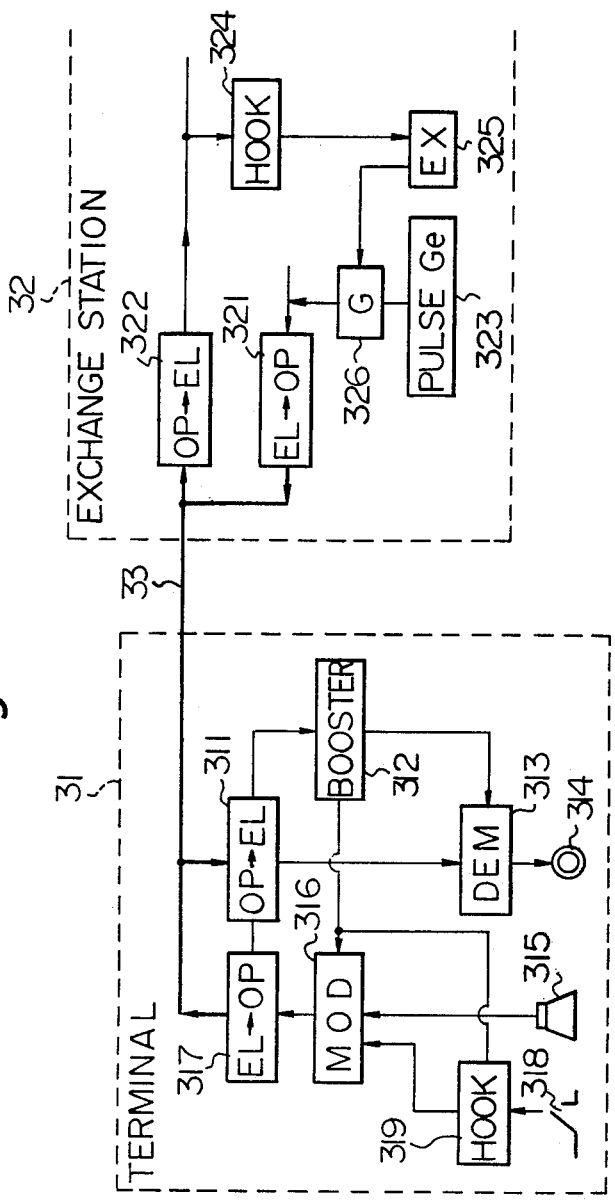
FIG. 3 is a block diagram of the power supply to terminal equipment through optical fiber cable according to the present invention.

FIG. 3 is the block diagram of the power supply system from an exchange station to a telephone subscriber according to the present invention. In the figure, the reference numeral 31 is a terminal device or subscriber equipment, 32 is an exchange station, and 33 is an optical fiber cable connecting the subscriber equipment to the station. The terminal device 31 comprises an optical-electrical converter 311, a DC booster 312, a demodulator 313, a receiver 314, a microphone 315, a modulator 316, an electrical-optical converter 317, a hook switch 318 which is closed when a telephone set is inactive and is opened when a telephone set is active or operating, and a hook switch detector 319 which detects the status (ON or OFF) of the hook switch 318. The station 32 comprises an electrical-optical converter 321, an optical-electrical converter 322, a power pulse generator 323, a hook detector 324, an exchange control system 325, and a gate circuit 326.

Figure 4:
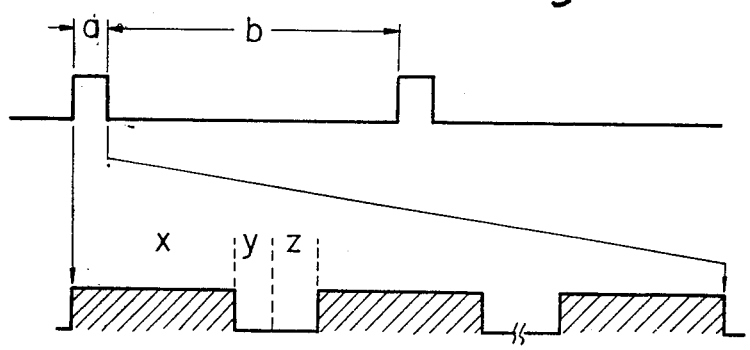
FIG. 4 shows the operation of the device of FIG. 3 when terminal equipment is not active.

FIG. 4 shows the operational time sequence in the optical fiber cable 33, and the duration of (a) is for instance 2 milli-second, and the duration of (b) is 198 milli-second. The content of the duration of (a) is the same as that of FIG. 2 having the power transmission duration (x), and the signal transmission durations (y) and (z). In the preferred embodiment, the duration of (x) is 57.5 $\mu$s, the duration of (y) is 2 $\mu$s, and the duration (z) is 2 $\mu$s.

The exchange control system 325 in the exchange station can recognize that the terminal device 31 is inactive, or a handset having a microphone 315 and a receiver 314 is put on a telephone set. Then, the exchange control system 325 controls the gate circuit 326 so that the gate circuit 326 opens only the duration (a) of FIG. 4. That duration (a) is for instance 2 mS, and the period (a+b) in FIG. 4 is 200 mS. Accordingly, a power pulse is supplied for 2 mS in every 200 mS. The power pulse is converted by the electrical-optical converter 321 from the electrical form to the optical form, and is forwarded to the terminal device through the optical fiber cable 33. Then, that power pulse is re-converted to the electrical form by the optical-electrical converter 311 in the terminal device 31. The output of that converter 311 is applied to the DC booster 312, which then, supplies the operational voltage only for the duration of (a) of FIG. 4, and does not supply that operational voltage for other durations. That DC booster 312 can be implemented by the combination of a rectifier, a smoother, a comparator which compares the smoothed DC output voltage with the reference voltage prepared by a zener diode, and a gate circuit for passing the smoother DC output voltage only when the comparator indicates that the output voltage is higher than the reference voltage.

When a handset of a telephone set is taken off, that is to say, when a telephone set is active, the hook switch 318 is opened, and that open status of the hook switch 318 is detected by the hook switch detector 319 when the power pulse is supplied to the terminal device 31. Therefore, the status change of the hook switch 318 can be detected within 200 mS after the handset is taken off. The hook switch detector 319 generates a status signal pulse which indicates that a subscriber is calling and a telephone set is going to be active. That pulse signal is applied to the modulator 316, which modulates that pulse signal to a PCM code, and transmits the modulated signal during the period (y) of FIG. 4 to the station.

That status signal pulse is supposed to have a different form from a pulse train of a voice signal, for instance, a pulse width, a pulse amplitude and/or a number of pulses of the former are different from the latter.

That status signal pulse is detected by the hook detector 324 in exchange station 32, which informs the reception of the status signal pulse to the exchange control system 325. Then, the exchange control system 325 operates in order to establish the call process as it is usual in an ordinary telephone exchange system, and has the gate circuit 326 open as shown in FIG. 2. Thus, the power pulse is always supplied to the terminal device, and the speech through the terminal device 31 is performed in the same manner as a conventional one of FIG. 1.

When speech at the terminal device 31 finishes, the second status pulse signal which indicates that the handset is put on the telephone set, is generated by the hook switch detector 319, and said second status pulse signal is sent to the station 32 through the modulator 316, the electrical-optical converter 317 and the optical fiber cable 33 during the time slot (y) of FIG. 2. Upon detection of that second status pulse signal by the exchange control system 325 in the exchange station 32, the gate circuit 326 is controlled so as to open during only the time slot (x) of the period (a) of FIG. 4. Thus, the power supply from the station to terminal devices is small when terminal devices are inactive, and when terminal devices operate enough power is supplied for the operation of the terminal device.

All the components in the blocks of FIG. 3 are obvious to those skilled in the art, and can be implemented by using conventional electronic circuit elements.

Figure 1:
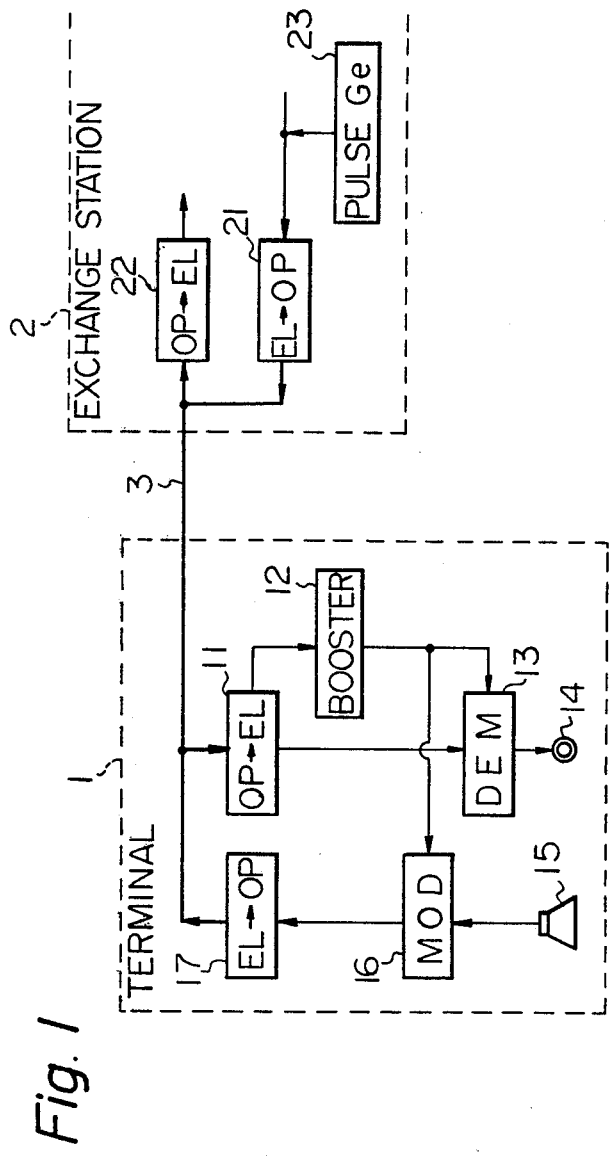
FIG. 1 is a block diagram of the prior power supply system to terminal equipment through an optical fiber cable.
Figure 2:
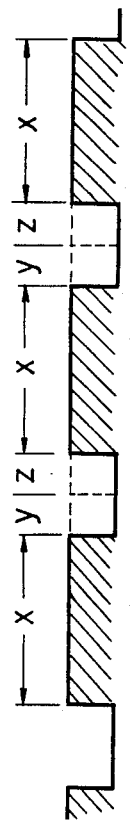
FIG. 2 shows the operation of the device of FIG. 1.

According to the present invention, the power supply from the exchange station to a terminal device is only $a/(a+b)$ when that terminal device is inactive, compared with the prior power supply system shown in FIG. 1. That ratio $a/(a+b)$ is for instance 1/100 when $a=2$ mS, and $b=198$ mS. Considering the statistical fact that a telephone set is active only in a few percents of time in a day, it is apparent that the present invention saves much power supply.

Figure 5:
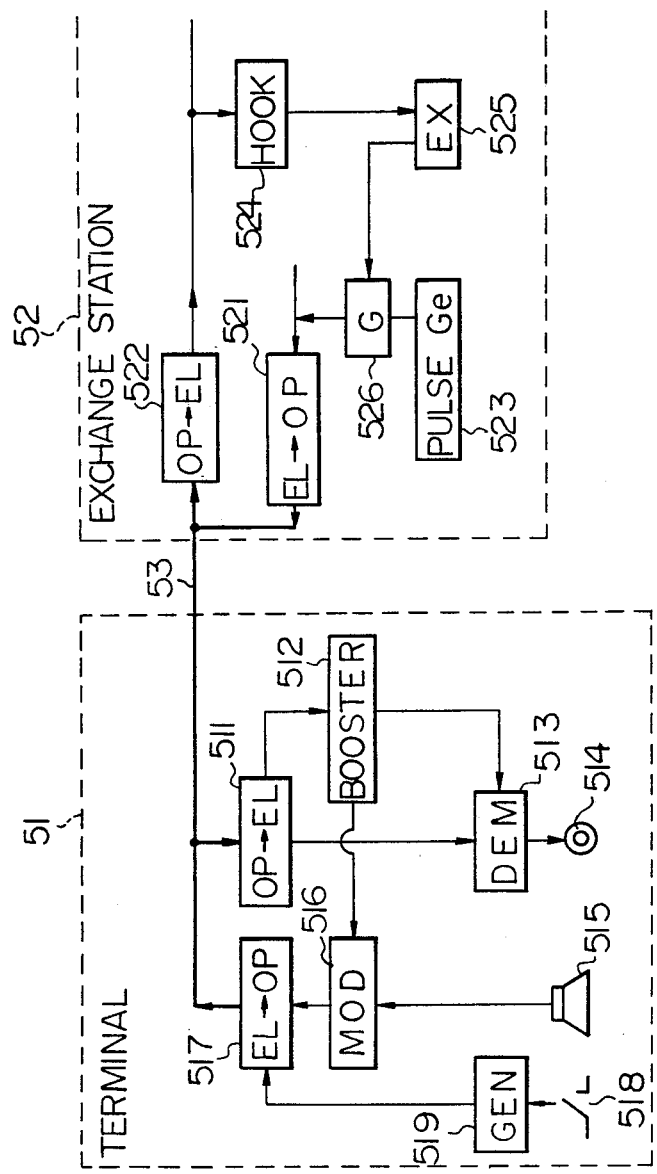
FIG. 5 is a block diagram of another embodiment of the power supply system to terminal equipment through an optical fiber cable according to the present invention.

FIG. 5 is the block diagram of the other embodiment of the present power supply system. In the figure, the reference numeral 51 is a terminal device, 52 is an exchange station, and 53 is an optical fiber cable. The terminal device 51 comprises of an optical-electrical converter 511, a DC booster 512, a demodulator 513, a receiver 514, a microphone 515, a modulator 516, an electrical-optical converter 517, a hook switch 518 which detects whether a handset having a receiver 514 and a microphone 515 is put on a telephone set or not, and a generator 519. Further, the exchange station 52 comprises an electrical-optical converter 521, an optical-electrical converter 522, a power pulse generator 523, a hook detector 524, an exchange control system 525, and a gate circuit 526.

In the embodiment of FIG. 5, the exchange control system 525 has the gate circuit 523 closed completely to prevent the power pulse, when the terminal device 51 is inactive. Accordingly, when a terminal device does not operate, no power supply is supplied to the terminal device.

When a handset having a receiver 514 and a microphone 515 is lifted for initiating a call, the contacts of the hook switch 518 is given some mechanical energy, which has the generator 519 generate some electric power. That electric power generated upon lifting a handset is converted to an optical form having a predetermined format of status pulse codes, and is transmitted to the exchange station 52 through the optical fiber cable 53. In the exchange station 52, the hook detector 523 recognizes the status pulse codes, which are informed to the exchange control system 525. Then, the exchange control system 525 begins the power supply by opening the gate circuit 526. When a terminal device is supplied power, the terminal device operates to serve the speech using the power supply from the station, and when the speech finishes and the handset is put down, the power supply stops in the similar manner to that of FIG. 3. As a modification of FIG. 5, the status of the hook switch 518 can be acknowledged using the power supply from the station, after the station begins the power supply, and the station can recognize the status of the hook switch more correctly.

Figure 6:
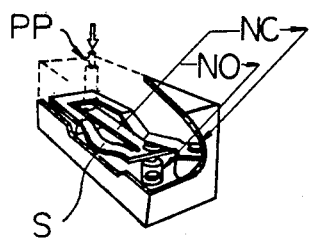
FIG. 6 shows the structure of the self-generator 519 in FIG. 5.
Figure 7:
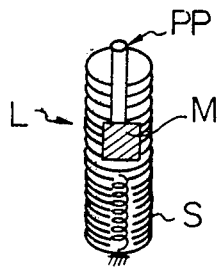
FIG. 7 shows another structure of the self-generator 519 in FIG. 5.
Figure 8:
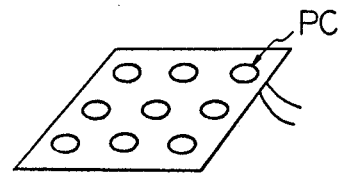
FIG. 8 is the still another structure of the self-generator 519 in FIG. 5.

Next, some embodiments of the generator 519 are described in accordance with FIGS. 6 through 8.

FIG. 6 shows the first embodiment of the generator 519, in which a pin-plunger PP is engaged with the hook switch 518 so that a spring S is curved and stores the mechanical energy in the spring S, when a handset is put or a telephone set is inactive. The symbol NC is a normally closed contact, and the symbol NO is a normally opened contact. A piezo-electric element which provides piezo electricity upon strike of the element is secured at those contacts NC and NO. When a handset is taken off, the pin-plunger PP and a spring S are released, and the piezo-electric elements are stricken by the energy stored in the spring S, and generates some piezo-electricity, which is provided to an external circuit through the contacts NC and NO.

FIG. 7 is the second embodiment of the generator 519, which comprises of a solenoid coil L, a permanent magnet M secured in the coil L by the coil spring S, and a pin-plunger PP coupled to the magnet M and engaged with the hook switch 518. When a handset is put on a telephone set, the spring S is pushed through the pin-plunger PP and stores the mechanical energy in the spring. When the handset is taken off, the pin-plunger PP is released and the energy stored in the spring S is also released, then, that released energy moves the magnet M. When the magnet M moves, the solenoid coil L induces output voltage, which is the indication of the lifting of a handset.

FIG. 8 is another embodiment of the generator 519, in which a plurality of photo-cells PC are attached on the surface of a terminal device. Said photo-cell PC provides the output electricity when illuminated by the sun or a room light, and output of the photo-cell is stored in a capacitor or a battery (not shown), which operates as a power source for initiating the call by the terminal device.

As described above in detail, according to the present invention, the power supply from an exchange station to terminal stations is limited when terminal stations are inactive, and the power consumption in the exchange station is saved considerably when an optical fiber cable is utilized. The power consumption according to the present invention is less than 1/100 compared with the conventional system. Thus, the present invention is beneficial in the introduction of an optical fiber cable to connect an exchange station and a plurality of subscribers.

From the foregoing it will now be apparent that a new and improved power supply to terminal equipment through an optical fiber cable has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A power supply system for an exchange station to terminal equipment through an optical fiber cable for operating said terminal equipment comprising;
   (a) a single optical fiber cable connecting the exchange station to terminal equipment for transmitting signals in both directions from the exchange station to the terminal equipment and from the terminal equipment to the exchange station, and for transmitting an optical energy in the form of an optical pulse from the exchange station to the terminal equipment, all of said transmissions being on a time divisional basis,
   (b) a terminal equipment having at least a microphone and a receiver connected to said optical fiber cable through means for converting a signal between an electrical form and an optical form, and means for recognizing whether the terminal equipment is inactive or active and transmitting a status signal to an exchange station when the status of the terminal equipment changes from the inactive status to the active status,
   (c) an exchange station having at least an exchange control system connected to the optical fiber cable through means for converting a signal between an electrical form and an optical form, a power pulse generator, a gate circuit for passing the power pulse of the power pulse generator to the optical fiber cable, said control system controlling said gate circuit so that when the terminal equipment is inactive the gate circuit opens intermittently less than 1/10 of time, and when the terminal equipment is active the gate circuit almost always opens.

2. A power supply system from an exchange telephone station to terminal equipment through an optical fiber cable for operating said terminal equipment comprising;
   (a) a single optical fiber cable (33) connecting the exchange station to terminal equipment for transmitting signals in both the directions from the exchange station to terminal equipment and from terminal equipment to the exchange station, and for transmitting optical energy in the form of an optical pulse from the exchange station to terminal equipment, all of said transmissions being on a time divisional basis,
   (b) terminal equipment (31) having at least an optical-electrical converter (311) connected to the end of the optical fiber cable (33), a receiver (314) connected to the output of said converter (311) through a demodulator (313), an electrical-optical converter (317) connected to the end of the optical fiber cable (33), a modulator (316) connected to the input of said electrical-optical converter (317), a microphone (315) connected to said modulator (316), a hook switch (318) for detecting the status of a handset having the microphone (315) and the receiver (314), a hook switch detector (319) for transmitting the information of a change of the status of the hook switch (318), all of the circuits in the terminal equipment (31) being operated by electric power obtained at the output of said optical-electrical converter (311), and
   (c) an exchange station (32) having at least an optical-electrical converter (322) and an electrical-optical converter (321) connected to the end of the optical fiber cable (33), a hook detector (324) connected to the output of the optical-electrical converter (322) for recognizing the status of the hook switch (318), a power pulse generator (323), a gate circuit (326) inserted between the output of the power pulse generator (323) and the input of the electrical-optical converter (321), and an exchange control system (325) which controls said gate circuit (326) so that when the terminal equipment (31) is inactive the gate circuit (326) opens intermittently less than 1/10 of time, and when the terminal equipment (31) is active the gate circuit (326) almost always opens.

3. A power supply system from an exchange station to terminal equipment through an optical fiber cable for operating said terminal equipment comprising;
   (a) a single optical fiber cable connecting the exchange station to terminal equipment for transmitting signals in both directions from the exchange station to terminal equipment and from the terminal equipment to the exchange station, and for transmitting an optical energy in the form of an optical pulse from the exchange station to the terminal equipment, all of said transmissions being on time divisional basis,
   (b) terminal equipment having at least a microphone and a receiver connected to said optical fiber cable through conversion means between an electrical form and an optical form, a generator means for generating an electrical signal upon detection of the change of the status of the terminal equipment from an inactive status to an active status, and the output of said generator means being forwarded to said exchange station through said optical fiber cable, and
   (c) said exchange station having at least an exchange control system connected to the optical fiber cable through conversion means between an optical form and an electrical form, a power pulse generator, a gate circuit for passing the power pulse of the power pulse generator to the optical fiber cable, said control system controlling said gate circuit so that when the terminal equipment is inactive the gate circuit is closed and when the terminal equipment is active the gate circuit is almost always opened.

4. A power supply system according to claim 3, wherein said generator means has a piezo electric generator operative in response to a change of condition of a handset.

5. A power supply system according to claim 3, wherein said generator means has a permanent magnet inserted in a solenoid coil so that said magnet moves when a handset is picked up.

6. A power supply system according to claim 3, wherein said generator means has a photo-cell and means for storing the electricity generated by said photo-cell.

* * * * *